W. H. GATES.
MACHINE FOR MAKING NIPPLES.
APPLICATION FILED NOV. 23, 1914.

1,200,185.

Patented Oct. 3, 1916.
4 SHEETS—SHEET 1.

Witnesses:—

Inventor—
W. H. Gates.
by Southgate & Southgate
Attorneys.

UNITED STATES PATENT OFFICE.

WILLIAM H. GATES, OF NEW HAVEN, CONNECTICUT, ASSIGNOR TO EASTERN MACHINE SCREW CORPORATION, OF NEW HAVEN, CONNECTICUT, A CORPORATION OF CONNECTICUT.

MACHINE FOR MAKING NIPPLES.

1,200,185. Specification of Letters Patent. Patented Oct. 3, 1916.

Application filed November 23, 1914. Serial No. 873,488.

*To all whom it may concern:*

Be it known that I, WILLIAM H. GATES, a citizen of the United States, residing at New Haven, in the county of New Haven and State of Connecticut, have invented a new and useful Machine for Making Nipples, of which the following is a specification.

This invention relates to a machine for making automatically articles which have to be subjected to a plurality of finishing operations on both ends, as for example, the nipples used in securing the wire spokes of automobile and other wheels to the rims.

The principal objects of the invention are to provide a machine for this purpose which will be entirely automatic and very rapid in operation; and especially to provide an improved work holding device; to provide an improved way of securely holding the work in position on the work holder or carrier and for releasing it therefrom; and to provide other mechanism coöperating therewith for performing the various operations on the blanks.

Further objects and advantages of the invention will appear hereinafter.

Reference is to be had to the accompanying drawings, in which—

Figure 1:
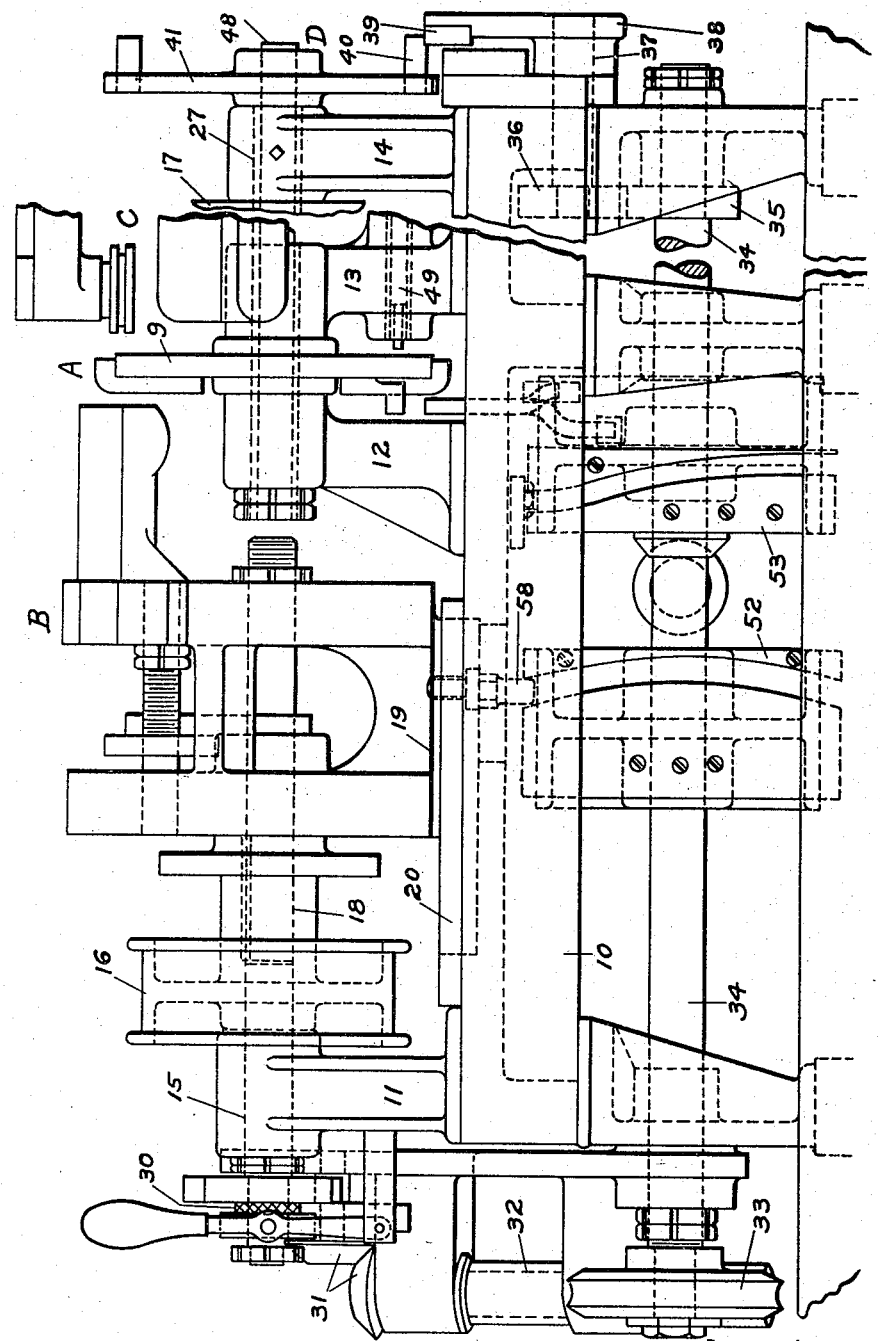
Figure 2:
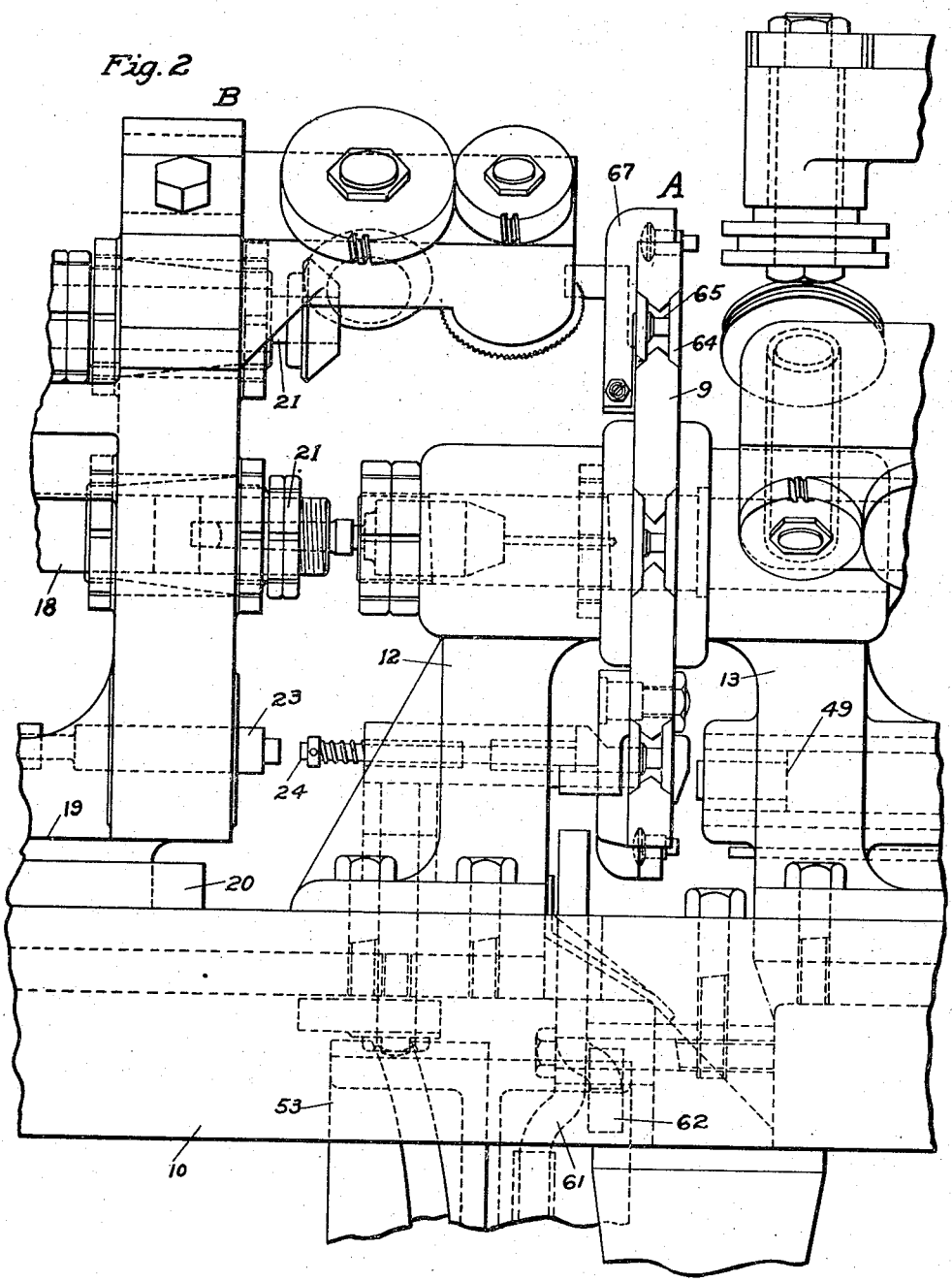
Figure 3:
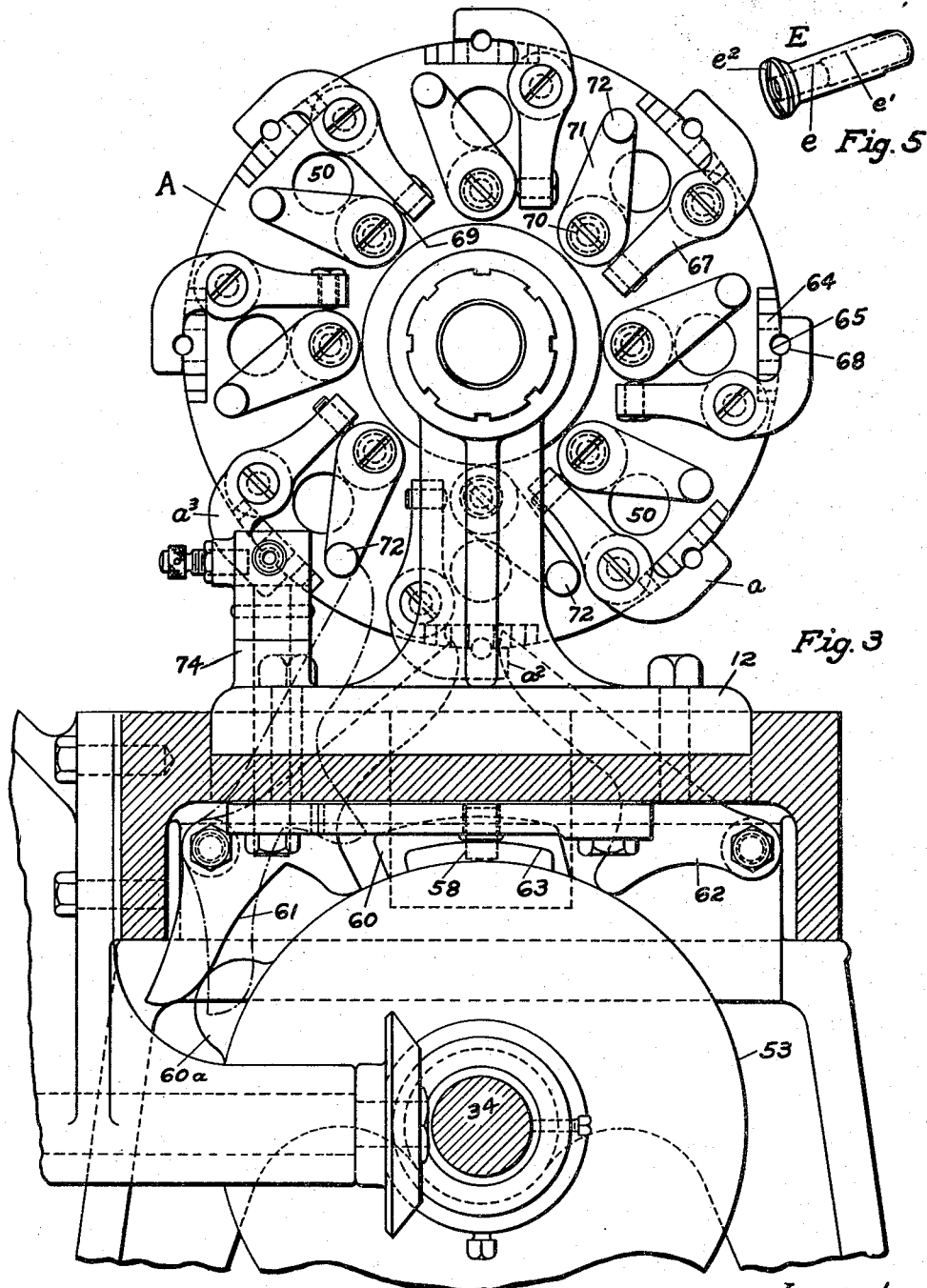
Figure 4:
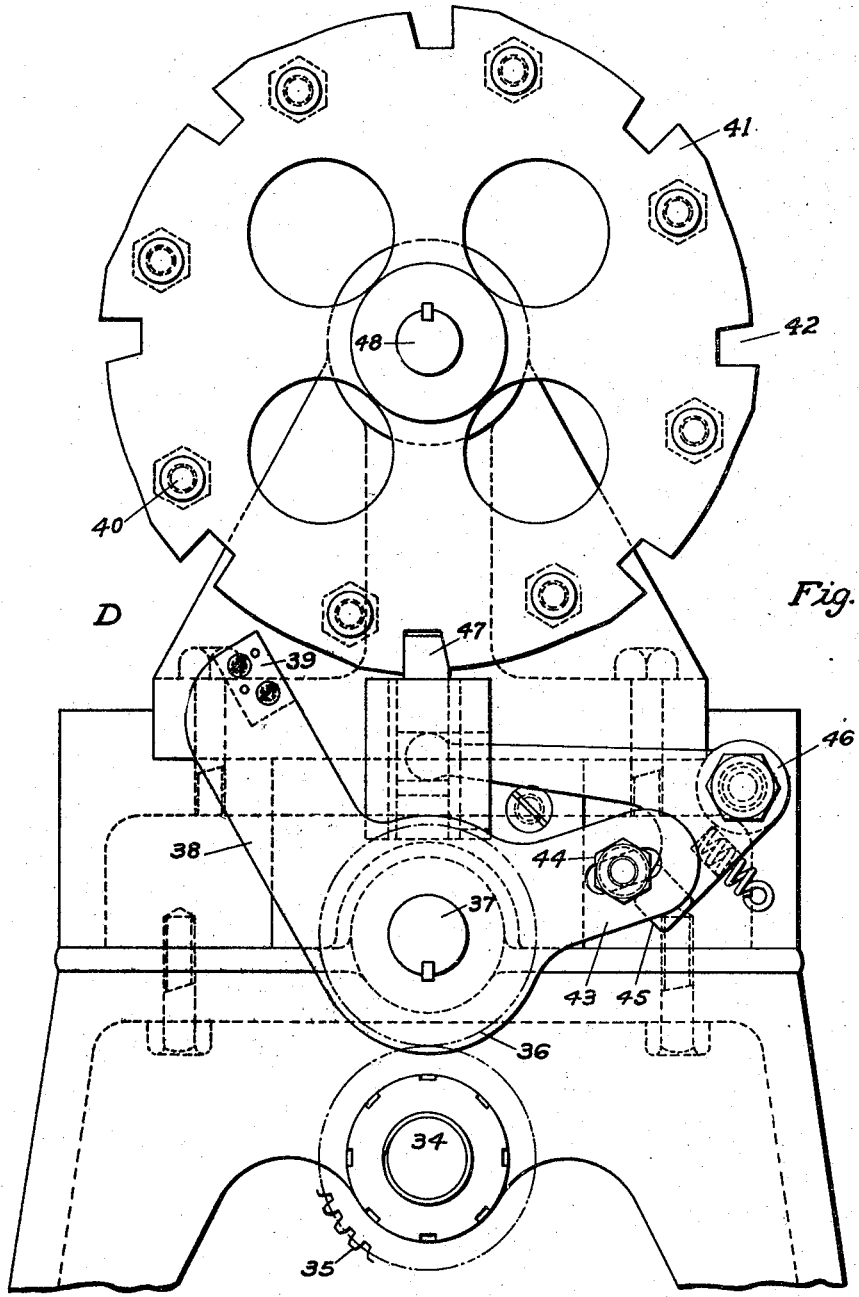

Figure 1 is a side elevation of a machine constructed in accordance with this invention for making nipples; Fig. 2 is a similar view of a portion thereof on a larger scale; Fig. 3 is a sectional view on the line 3—3 of Fig. 1 showing the work carrying mechanism in elevation; Fig. 4 is an end elevation showing the indexing device; and Fig. 5 is a perspective view of the nipple to be finished by this machine.

In the form of the invention shown in the drawings the mechanism can be considered as consisting mainly of four parts, a work holding and carrying device A, two heads B and C for carrying the tools, and an indexing device D. The machine shown is designed for finishing forged blanks to form the nipple E shown in Fig. 5. It will be understood that the work holding device A is in the form of a rotary disk 9 and that the indexing device is designed to give it an intermittent rotation stopping it at intervals and that the two tool holding heads B and C operate on the several blanks held by the work holding disk when the latter is held in stationary position.

With this in view I will now describe the mechanism shown in the drawings.

The frame 10 of the machine is provided with brackets 11, 12, 13 and 14 having bearings for supporting the shafts. On one of these shafts 15 is a main driving pulley 16, a similar driving pulley 17 being indicated at the other end of the machine. The pulley 16 is fixed to the shaft 15. In alinement with the shaft 15 is a shaft 18 loosely keyed to the pulley hub. This shaft 18 can move axially but will always be in driving relation to the shaft 16 and pulley. The shaft 18 is connected with the driving head B which has a foot 19 that slides in ways 20. This head B is provided with a plurality of bearings for shafts 21 all geared up to the shaft 18 so that as this shaft rotates these shafts also rotate in their bearings. Each shaft carries a tool, as a drill, tap, slotting saw, etc. The particular arrangement of these tools is not herein shown in full as it will be understood that any kind of tools can be employed necessary for the particular work in hand. This head also carries a reciprocable ejector pin 23 for engaging a spring-pressed plunger 24 supported by the bracket 12 for the purpose of ejecting the work as will appear hereinafter.

The head C is similarly arranged, the tools thereon being geared up to a rotatable sleeve 27 carried by the brackets 13 and 14 and operated directly by the pulley 17 which is keyed to it.

The shaft 15 is adapted to be connected by a clutch 30 with beveled gears 31 so as to rotate a worm shaft 32. This shaft by means of a worm thereon constantly but slowly rotates a worm gear 33 on a shaft 34 running lengthwise of the machine. This shaft is provided with a gear 35 meshing with a gear 36 on a shaft 37 having an arm 38 thereon. This arm is provided with a steel piece 39 set into the same and adapted to engage on each rotation one of the studs 40 projecting from an indexing wheel 41. Therefore each rotation of the shaft 34 results in turning the indexing wheel 41 one step. The parts are so designed in this case as to turn it one-eighth of a revolution.

For the purpose of locking the indexing wheel in its stationary positions it is provided with a series of notches 42 in its circumference, eight in number. The shaft 37 is also provided with another arm 43 which is shown integral with the arm 38 and on this is adjustably mounted a stud 44. This engages a projection 45 of a spring-pressed bell crank 46. The other arm of this bell crank is connected with a sliding latch 47 adapted to engage in the notches 42 periodically and hold the indexing wheel in its stationary positions. This indexing wheel is fixed on a shaft 48 which passes through the sleeve 27 and carries the disk 9 on its other end. Thus the disk is rotated intermittently. In order to provide for accurately and positively holding the disk 9 in each of its stationary positions a plunger 49 is carried by the head C and is arranged to reciprocate with that head. As soon as one of the right perforations 50 on the disk 9 comes into registration with the plunger the plunger will enter it and accurately hold the disk in fixed position.

The shaft 34 is provided with several cam drums 52, and 53. The two cam drums 52 are provided with cams 57 which engage studs 58 screwed into the bases of the heads B and C respectively. Consequently these cams reciprocate the heads periodically once during each rotation of the shaft 34. This obviously is for the purpose of bringing the tools toward the work and withdrawing them and also for forwarding the ejector pin 23 and the positioning plunger 49.

The cam drum 53 is provided with two cams 60 and 60$^a$ for engaging a chuck lever 61 and moving it into and out of operative position. A second lever 62 for releasing the work is operated by a cam 63. These levers are designed to control the clamping of the work carrying disk 9.

The disk 9 is shown as provided at its edge with a plurality of plates 64 set into the edge and each having a notch 65 at the edge for receiving the work. In the form shown there are eight of these plates 64 and there are a corresponding number of clamping levers 67. Each one of these is pivoted to the disk near the circumference and is provided with a notch 68 adapted to register with a notch 65 in order that a blank may be clamped in these notches. For the purpose of operating these clamping levers each is provided with a screw point 69 and the disk is provided with a series of studs 70 on which are located eccentric clamping members 71. Each of these has a projecting arm 72 for operating it. It will be obvious that the swinging of the arms 72 in one direction will cause the levers 67 to move over into clamping position and will positively hold them in that position without requiring any additional locking means. Throughout the time during which they are held in this position they are securely clamped with sufficient pressure to avoid any danger of the loosening of the blanks held by them.

The function of the levers 61 and 62 will now be understood. As each clamping lever reaches the position indicated at $a$ it will be understood that all the operations have been performed on the blank. As the disk then rotates one step from the position $a$ to the position $a^2$ the lever 62 is oscillated by its eccentric to swing back the arm 72 which is approaching the position $a^2$. This throws the eccentric 71 over to the low side and releases the lever 67 from pressure. Then when the clamping mechanism comes to the position $a^3$ and stops there the ejector operates to discharge the blank from the machine and that lever 67 remains loose until after the new blank is inserted. Then the lever 61 is actuated rapidly by its eccentric so as to engage the end of the arm 72 and swing the arm back to locking position. This is accomplished it will be understood while the disk is held in stationary position.

Any desired means can be provided for feeding the work into position but none is shown herein as that does not constitute a part of this invention. But mounted on the bracket 12 is a support 74 for receiving the blanks and this indicates the point at which the blanks are applied to the disk. According to the embodiment of the invention as shown in the drawings this blank is simply supported on the support 74 and is moved in by hand at this time but it will be understood, of course, that automatic feeding mechanism can be employed properly timed to insert the blank just before the lever 67 is clamped by the motion of the lever 61. During the remainder of the motion of this particular work clamping set that I have been describing the work is held clamped in position by the eccentric and no ordinary jar or vibration will loosen the arm which clamps the work. It will be understood of course that during the successive partial rotations of the head the several necessary operations are performed on the blank from one or both sides of the disk.

The operation of the machine will now be described.

Power being applied to the two pulleys 16 and 17 so that they rotate constantly it will be understood that when the clutch 30 is thrown off the several tools carried by the heads B and C will rotate on their axes without performing any operations. Now when the clutch 30 is thrown in, the shaft 34 is caused to rotate. Each revolution of the shaft 34 results in turning the indexing wheel 41 one-eighth of a revolution and locking it in fixed position so that the major part of the revolution of the shaft 34 can take place with this wheel locked in fixed position. This also turns the work carrying disk 9 one-eighth of a revolution and it is independently locked in that position by means of the plunger 49. During each complete operation of the shaft 34 the disk 9 therefore rotates one space and one of the work clamps is loosened by the operation of the lever 62 so as to permit the discharge of the completed work therefrom. At the same time the next work holding device in advance of this one moves up into the position $a^3$ in Fig. 3 to receive a new blank and the lever 61 operates to clamp it in position. Then the parts move on to the next position on account of the next rotation of the shaft 34. Once during each rotation of the shaft 34 and during the period of rest of the disk 9 the two heads B and C are moved up toward the disk 9 by their cams 52 so as to bring their respective tools into operation. The parts are so designed preferably that one operation only is performed on each blank at a time. Referring to the nipple E in Fig. 5, it will be seen that a small drill hole $e$ is provided by inserting a drill from one end and a large drill hole $e'$ by inserting a larger drill from the other end. The smaller hole is tapped, the end is trued up and a slot $e^2$ cut in the head. The other end also is preferably trued up. These and other operations can be performed with the parts designed as shown herein. In this case, there being eight positions of the head, two of them are used for releasing the old blank and receiving a new one, the other six can be employed one for each operation.

Although I have illustrated and described only a single embodiment of the invention and shown it as applied to the manufacture of a definite article, I am aware of the fact that the principles of the invention can be carried out in other forms and can be used for the manufacture of other articles without departing from the scope of the invention as expressed in the claims. Therefore, I do not wish to be limited in these respects, but What I do claim is:—

1. In a machine of the character described, the combination of a rotatable disk for supporting the work, a plurality of work clamps thereon, a lever for operating said clamps, means rotatable a plurality of times to each rotation of the disk for operating said lever, a finishing tool head movable toward and from the disk, a reciprocable plunger for ejecting a finished article from the disk, and an ejector pin carried by said head for operating the plunger when the head moves toward it.

2. In a machine of the character described, the combination of a circular disk having a plurality of notches in its edge for receiving the work, a corresponding number of levers carried by the disk, each having a notch on its inner face for coöperating with one of said notches in the edge of the disk to clamp the work on the circumference of the disk, a series of eccentrics mounted on the disk, each having an arm projecting therefrom, and an eccentric surface for engaging and operating one of said levers, a lever mounted independently of said disk, a shaft, a cam on said shaft for periodically moving said lever into a position to engage one of said arms and turn the eccentric connected therewith into a position to clamp the work clamping lever, another lever mounted independently of the disk, and a cam on said shaft for periodically turning it into a position to engage one of said arms and swing it in the opposite direction to release one of the work clamping levers.

In testimony whereof I have hereunto set my hand, in the presence of two subscribing witnesses.

WILLIAM H. GATES.

Witnesses:
  BENJ. P. GREENE,
  ROSE E. DILG.

Copies of this patent may be obtained for five cents each, by addressing the "Commissioner of Patents, Washington, D. C."